US011850895B2

(12) United States Patent
Schott et al.

(10) Patent No.: US 11,850,895 B2
(45) Date of Patent: Dec. 26, 2023

(54) METHOD FOR DYNAMICALLY DETERMINING A TIRE LONGITUDINAL FORCE

(71) Applicant: DEERE & COMPANY, Moline, IL (US)

(72) Inventors: Florian Schott, Einhausen (DE); Norbert Fritz, Ilvesheim (DE)

(73) Assignee: DEERE & COMPANY, Moline, IL (US)

(*) Notice: Subject to any disclaimer, the term of this patent is extended or adjusted under 35 U.S.C. 154(b) by 736 days.

(21) Appl. No.: 17/027,009

(22) Filed: Sep. 21, 2020

(65) Prior Publication Data

US 2021/0001673 A1  Jan. 7, 2021

Related U.S. Application Data

(63) Continuation of application No. PCT/EP2019/057848, filed on Mar. 28, 2019.

(30) Foreign Application Priority Data

Mar. 29, 2018 (DE) .......................... 102018204893.2

(51) Int. Cl.
 *B60C 23/04* (2006.01)
 *B60C 23/06* (2006.01)
 (Continued)

(52) U.S. Cl.
 CPC ........ *B60C 23/0488* (2013.01); *B60C 23/064* (2013.01); *B60W 40/064* (2013.01);
 (Continued)

(58) Field of Classification Search
 CPC ... B60C 19/00; B60C 23/064; B60C 23/0488; B60W 2050/0037; B60W 2422/70;
 (Continued)

(56) References Cited

U.S. PATENT DOCUMENTS 6,658,927 B1  12/2003  Goslar et al.
7,676,307 B2   3/2010  Schmitt et al.
(Continued)

FOREIGN PATENT DOCUMENTS

CN  101281096 A  10/2008
CN  104554274 A   4/2015
(Continued)

OTHER PUBLICATIONS

Chinese Office Action issued in application No. 201980013781.9, dated Apr. 18, 2022, 5 pages.
(Continued)

*Primary Examiner* — Michael J Dalbo

(57) ABSTRACT

A method is provided for dynamically determining a tire longitudinal force. The method includes determining a tire acceleration variable by an acceleration sensor arranged in a tire bead, determining a first time interval between a tire contact patch entry point and an acceleration vertex by a processor unit, and determining a second time interval between the acceleration vertex and a tire contact patch exit point by the processor unit. The method also includes determining a magnitude or direction of a tire longitudinal force variable comprising a tire longitudinal force by the processor unit from a symmetry shift detected between the first and second time intervals.

20 Claims, 3 Drawing Sheets

(51) Int. Cl.
    *B60W 40/064*     (2012.01)
    *B60W 40/12*     (2012.01)
    *B60W 50/00*     (2006.01)

(52) U.S. Cl.
    CPC ..... *B60W 40/12* (2013.01); *B60W 2050/0037* (2013.01); *B60W 2422/70* (2013.01); *B60W 2530/20* (2013.01)

(58) Field of Classification Search
    CPC ........... B60W 2530/20; B60W 40/064; B60W 40/12; B60T 2210/12
    See application file for complete search history.

(56) References Cited

U.S. PATENT DOCUMENTS

| | | | |
|---|---|---|---|
| 8,402,821 B2 | 3/2013 | Fink et al. | |
| 8,880,286 B2 | 11/2014 | Fink | |
| 9,632,106 B2* | 4/2017 | Guinart | B60C 23/0416 |
| 2006/0219000 A1* | 10/2006 | Miyoshi | B60T 8/52 |
| | | | 73/146 |
| 2009/0234591 A1* | 9/2009 | Savaresi | B60T 8/1725 |
| | | | 73/146 |
| 2010/0131208 A1 | 5/2010 | Mancosu et al. | |

FOREIGN PATENT DOCUMENTS

| | | |
|---|---|---|
| CN | 105829185 A | 8/2016 |
| CN | 106461509 A | 2/2017 |
| DE | 102007039242 A1 | 2/2009 |
| DE | 102007062203 A1 | 6/2009 |
| EP | 3153374 A1 | 4/2017 |
| EP | 3153375 A1 | 4/2017 |
| JP | 2010051160 A | 3/2010 |
| JP | 2010159031 A | 7/2010 |
| JP | 2012122810 A | 6/2012 |

OTHER PUBLICATIONS

German Search Report issued in counterpart application No. 102018204893.2 dated Dec. 14, 2018 (12 pages).

International Search Report issued in counterpart application No. PCT/EP2019/057848 dated Jun. 3, 2019 (10 pages).

Doumiati et al., A method to estimate the lateral tire force and the sideslip angle of a vehicle: Experimental validation, dated Jun. 30-Jul. 2, 2010, pp. 6936-6942, 2010 American Control Conference, Marriott Waterfront, Baltimore, MD, USA.

* cited by examiner

METHOD FOR DYNAMICALLY DETERMINING A TIRE LONGITUDINAL FORCE

RELATED APPLICATIONS

This application is a continuation of PCT International Application Serial No. PCT/EP2019/057848, which has an international filing date of Mar. 28, 2019, designates the United States of America, and claims the benefit of German Application No. 10 2018 204 893.2, which was filed on Mar. 29, 2018, the disclosures of which are hereby expressly incorporated by reference in their entirety.

FIELD OF THE DISCLOSURE

The present disclosure relates to a method for dynamically determining a tire longitudinal force.

BACKGROUND

Conventional methods for determining the tire longitudinal force occurring in the contact region between tire and underlying surface are generally based on an assessment of the torque ratios occurring in a drive train. An assessment of this type is complicated and is possible exclusively in conjunction with driven wheels.

Thus, there is a need for a method which makes it possible to easily carry out a determination of the tire longitudinal force both at the driven and freely running wheels of a vehicle.

SUMMARY

In the present disclosure, a method is provided for dynamically determining a tire longitudinal force in which a tire acceleration variable is determined by an acceleration sensor arranged in a tire bead, the variable characterizing an acceleration occurring within the tire bead, wherein, proceeding from the determined tire acceleration variable, a first time interval or angular distance between a tire contact patch entry point and an acceleration vertex and a second time interval or angular distance between the acceleration vertex and a tire contact patch exit point are determined by means of a processor unit, wherein the magnitude or direction of a tire longitudinal force variable characterizing a tire longitudinal force is deduced by the processor unit from a symmetry shift detected between the two time intervals or angular distances.

The method makes use of the fact that air-filled tires are in contact with the underlying surface not, for example, in a line, as would be the case with a rigid cylinder, but rather in the region of a contact surface occurring as a result of compression, what is referred to as the tire contact patch. The tire forces acting in the longitudinal and transverse direction are transmitted here to the underlying surface in the tire contact patch. During the rotationally induced passage through the tire contact patch, the tire radius is reduced in a tire contact patch entry point before the radius receives its original nominal radius at the end of the tire contact patch in a tire contact patch exit point. This causes circumferentially acting (tangential) forces in the tire contact patch. According to the present disclosure, it has been recognized that an externally caused change in the forces leads to a tire contact patch that is displaced in respect of the symmetry of the two time intervals or angular distances. Such a change in the force ratios occurs, for example, during the acceleration or deceleration of the wheel and also due to the rolling resistance between tire contact patch and underlying surface.

The tire longitudinal force variable dynamically determined by the processor unit on the basis of the tire acceleration variable, that is to say by evaluating the dynamic behavior of the tire or tire contact patch, is therefore generally characterized by driving and braking forces occurring at the tire and the rolling resistance thereof. The latter is expressed in a corresponding rolling resistance force which is likewise manifested in the tire longitudinal force variable that is to be determined.

The symmetry shift is detected by comparing the two time intervals or else the two angular distances. The latter has the advantage that the symmetry shift does not depend on the tire circumferential speed. The presence of accelerating or decelerating forces at the tire can be deduced directly depending on the direction or sign of the detected symmetry shift.

Typically, the tire longitudinal force variable is determined by the processor unit on the basis of an assignment table specific to the type of tire used, wherein, in the assignment table, a multiplicity of predetermined values for the symmetry shift can be linked empirically with respectively corresponding values for the tire longitudinal force variable. In order to improve the data quality, it is conceivable that the assignment table is modified by the processor unit in accordance with information in respect of the filling pressure of the tire and/or the tire temperature. This is because these two variables, for their part, have a direct influence on the design of the tire contact patch.

As already mentioned at the beginning, the determined tire longitudinal force variable generally contains components in respect of a rolling resistance occurring during rolling along the tire and components which are attributed to driving or braking forces of the vehicle. In order in this respect to be able to make an unambiguous assignment, first of all, in order to identify the rolling resistance, a corresponding tire rolling resistance variable can be determined. The determination thereof is carried out by the processor unit on the basis of the tire longitudinal force variable determined in a travel state free from driving force or braking force. Whether the vehicle is in such a travel state can easily be deduced by the processor unit from the operating status of an associated driving or braking system.

In this connection, the determination of the tire rolling resistance variable by the processor unit can be carried out each time when such a travel state free from driving force or braking force is recognized, and therefore a current value in respect of the respective composition of the underlying surface is always provided.

The tire acceleration variable can be characterized by the acceleration sensor in particular by an acceleration acting tangentially or radially in the tire contact patch. It is also conceivable that a variation in the tire circumferential speed due to the radius change caused during the rotationally induced passage through the tire contact patch is evaluated by the processor unit and used for characterizing the tire acceleration variable. An inertial measurement unit included by the acceleration sensor can be used for this purpose.

Furthermore, the tire acceleration variable of the processor unit can be provided wirelessly by the acceleration sensor. Furthermore, information in respect of the type of tire and also the filling pressure of the tire or the tire temperature can be transmitted in order to use the information for selecting the assignment table specific to the type of tire used or to modify same. The wireless transmission can take place by means of a Bluetooth or RFID transponder.

The details in respect of the type of tire are stored in a storage unit assigned in the Bluetooth or RFID transponder, whereas filling pressure or tire temperature are provided by sensors.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
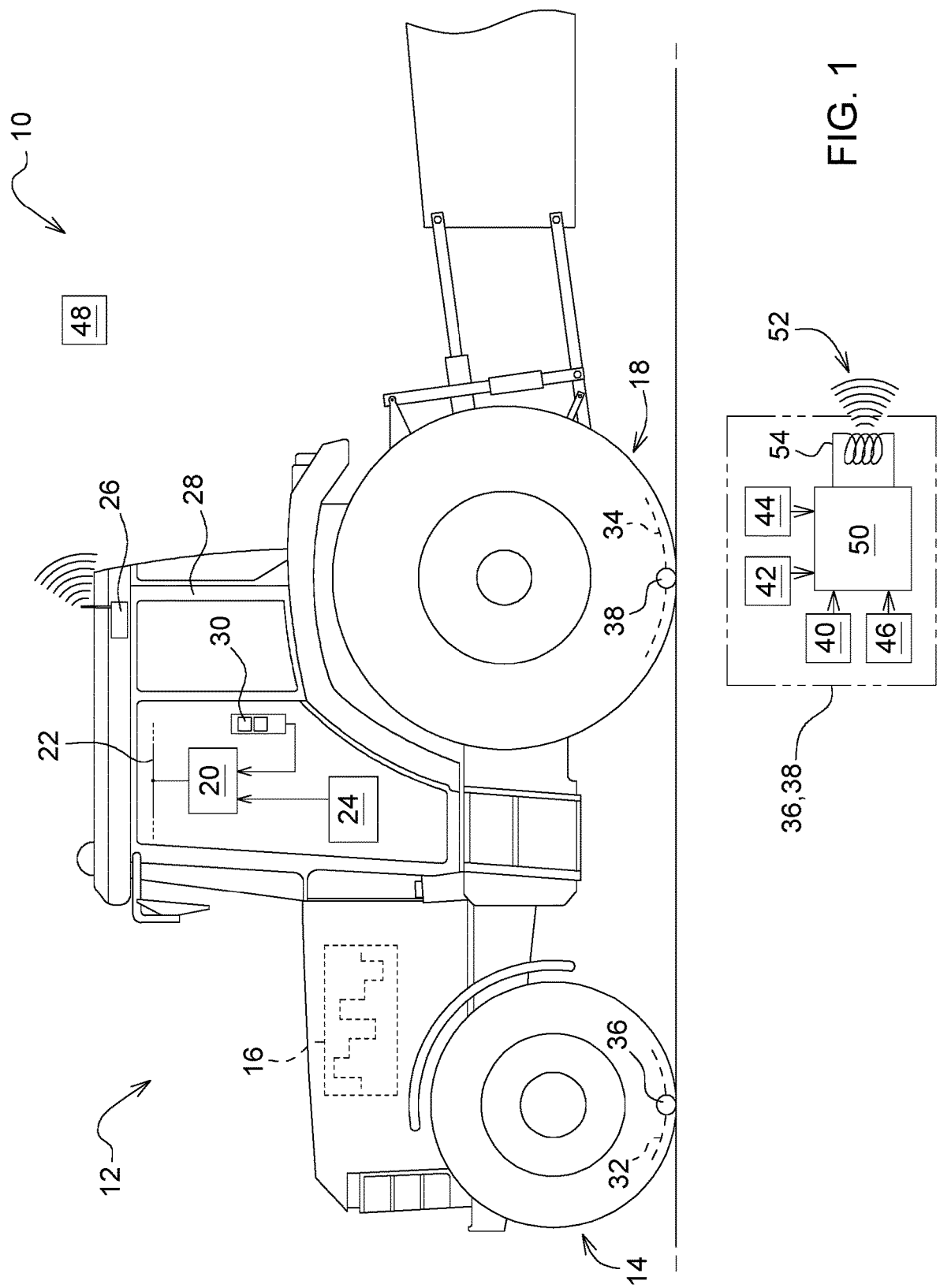
FIG. 1 shows a vehicle environment and in which the method according to the present disclosure is carried out.

FIG. 1 shows a vehicle environment which is illustrated by way of example and in which the method according to the present disclosure for dynamically determining a tire longitudinal force is carried out. The vehicle environment 10 illustrated schematically in FIG. 1 involves an agricultural tractor 12 having steerable front wheels 14 and rear wheels 18 driven by an internal combustion engine 16. In the present case, the front wheels 14 are formed in a freely running manner; alternatively, however, they can also be connectable in terms of drive to the internal combustion engine 16 of the agricultural tractor 12 via a mechanical front wheel drive (MFWD).

Furthermore, there is a processor unit 20 which is part of a control device architecture of the agricultural tractor 12, the control device architecture being indicated merely by a CAN data bus 22. The processor unit 20 is connected to a Bluetooth or RFID receiver 24, a WLAN interface 26 and an operator control unit 30 accommodated in a driver's cab 28.

A data detection unit 36, 38 embedded in a respective tire bead 32, 34 of the rear wheel or front wheel 14, 18 in each case has an acceleration sensor 40, a filling pressure sensor 42 and a temperature sensor 44. In addition, there is a storage unit 46 in which details relating to the type of tire are stored. Alternatively, the details can also be retrieved via the WLAN interface 26 in a central data server 48. The information provided by the data detection unit 38 and the storage unit 40 or the central data server 48 is supplied to a Bluetooth or RFID transponder 50 which produces a data exchange connection 52 with the Bluetooth or RFID receiver 24 of the agricultural tractor 12. The data detection unit 36, 38 is inductively supplied with power by the Bluetooth or RFID receiver 24 via an antenna 54 included by the Bluetooth or RFID transponder 50. Alternatively, the data detection unit is equipped with an optionally exchangeable (lithium) battery or a generator using the movement of the wheels.

Figure 2:
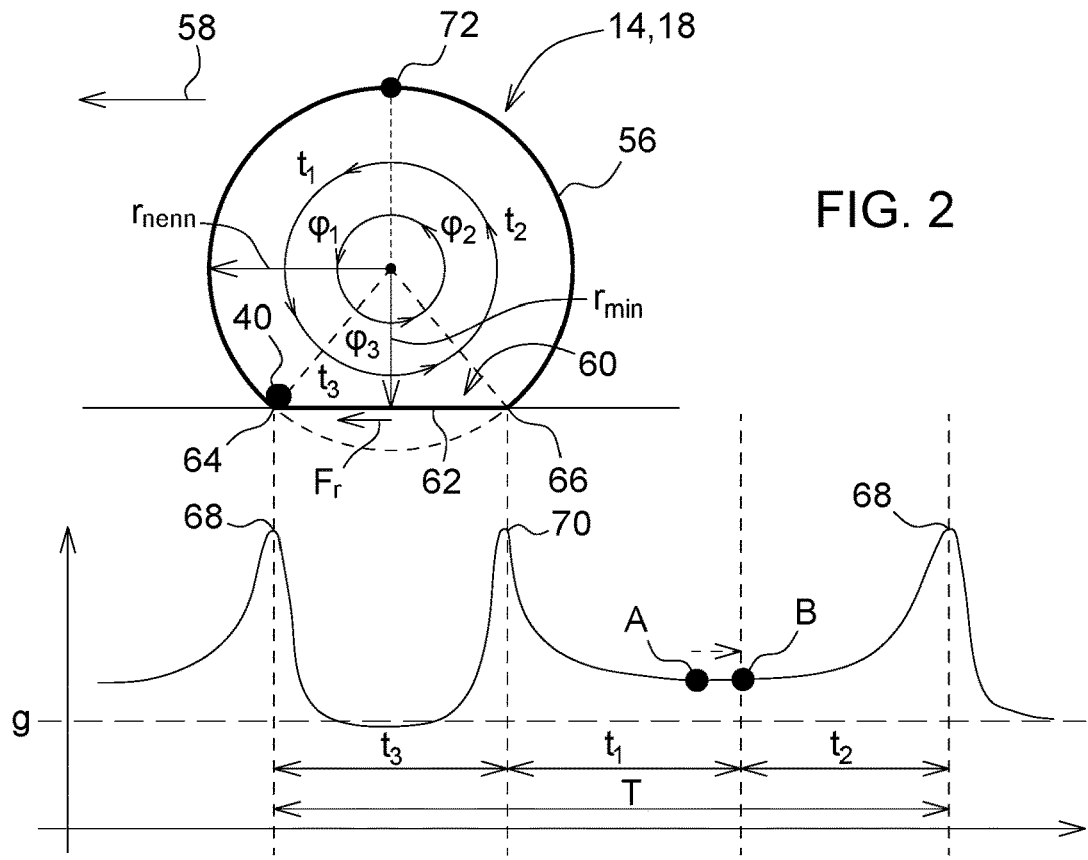
FIG. 2 shows an illustration of a tire contact patch occurring at a freely running wheel.

FIG. 2 furthermore illustrates a tire contact patch occurring at a freely running wheel. In the present case, the term "freely running" should be understood as meaning a wheel which is free from driving or braking forces, that is in which the associated tire is exclusively under the action of the rolling resistance occurring during the rolling motion.

The tire 56 assigned to the front or rear wheel 14, 18 of the agricultural tractor 12 has a nominal radius $r=r_{nom}$. Starting from the illustration in FIG. 2, the tire 56 rotates counterclockwise in accordance with the current direction of travel 58 of the agricultural tractor 12. Under the action of the tire contact forces, the tire 56 is compressed in the region of a contact surface 60. The contact surface 60 forms the tire contact patch 62. During the rotationally induced passage through the tire contact patch 62, the tire radius r is reduced in a tire contact patch entry point 64 to a minimum value $r_{min}$ before the tire radius at the end of the tire contact patch 62 receives its initial nominal radius $r_{nom}$ in a tire contact patch exit point 66.

The acceleration sensor 40 embedded in the tire bead 32, 34 determines the accelerations occurring here in the form of a tire acceleration variable. By way of example, the tire acceleration variable characterizes a radially acting acceleration which is detected by the acceleration sensor 40.

A typical profile of the tire acceleration variable relative to the acceleration of gravity g over a full wheel revolution with the period T is reproduced in the diagram of FIG. 2. According thereto, pronounced acceleration peaks 68, 70 occur in each case at the tire contact patch entry point 64 and at the tire contact patch exit point 66. Outside the tire contact patch 62, the tire acceleration variable passes through an acceleration vertex 72. First, second and third time intervals $t_1$, $t_2$, $t_3$ or angular distances $\varphi_1$, $\varphi_2$, $\varphi_3$ occur between tire contact patch entry point 64, tire contact patch exit point 66 and acceleration vertex 72.

In the completely force-free state of the tire 56, the first time interval $t_1$ or angular distance $\varphi_1$ between the tire contact patch entry point 64 and the acceleration vertex 72 is identical to the second time interval $t_2$ or angular distance $\varphi_2$ between the acceleration vertex 72 and the tire contact patch exit point 66. Accordingly, the acceleration vertex 72 has a central position A between the acceleration peaks 68, 70. If a circumferentially acting force acts in the tire contact patch 62, and if a rolling resistance force $F_r$ arising from the rolling resistance of the tire 56 is present, this leads to a symmetry shift between the two time intervals $t_1$, $t_2$ or the two angular distances $\varphi_1$, $\varphi_2$. The acceleration vertex 72 then takes up a position B which is offset counter to the current travel direction 58, $t_1 > t_2$ or $\varphi_1 > \varphi_2$. This is based on the effect of the rolling resistance force $F_r$ to oppose the rotationally induced passage through the tire contact patch 62 in a retarding manner.

Figure 3:
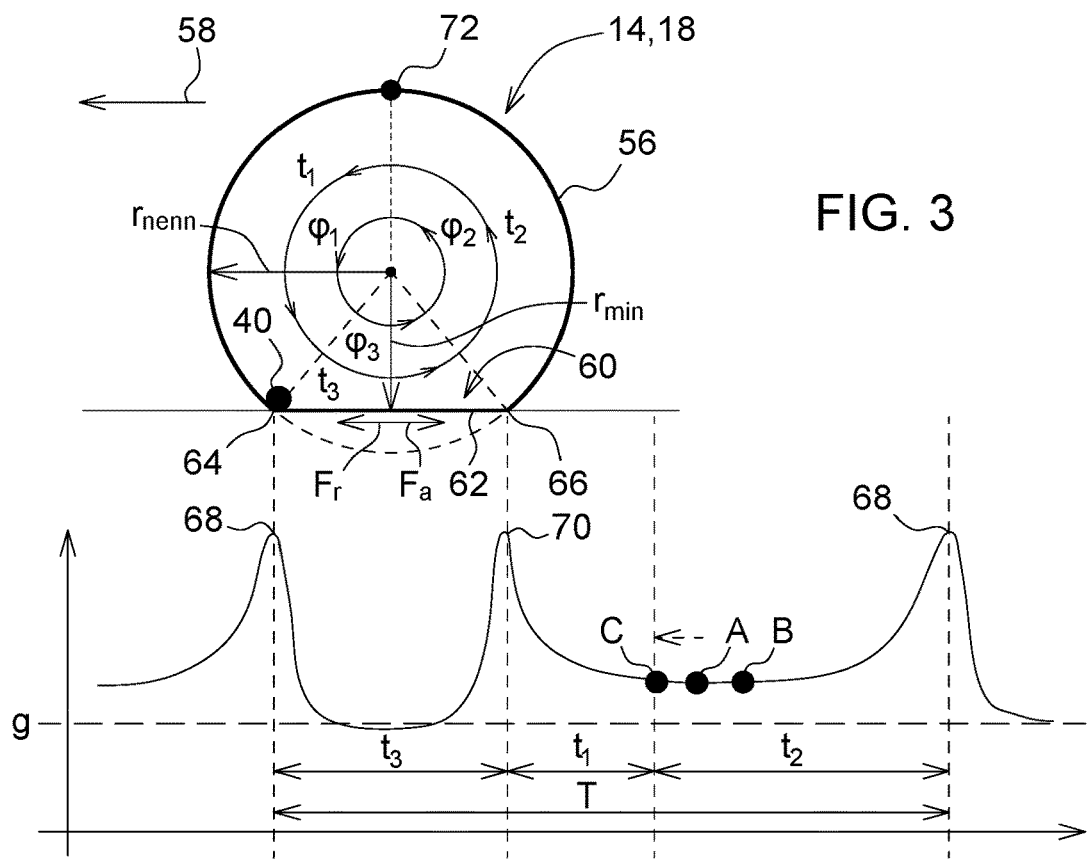
FIG. 3 shows an illustration of a tire contact patch occurring under the additional action of an accelerating driving force.

FIG. 3 illustrates the behavior of the tire contact patch under the additional action of an accelerating driving force. The driving force $F_a$ is superimposed on the rolling resistance force $F_r$ in the opposite direction, which, according to the diagram of FIG. 3, leads to a shift back of the acceleration vertex 72 into a position C, $t'_1 > t_1 > t_2$ or $\varphi'_1 > \varphi_1 > \varphi_2$. If, by contrast, a decelerating braking force (not illustrated) acts on the tire contact patch 62, the acceleration vertex 72 is shifted in the opposite direction.

The driving or braking force occurring at the tire 56 and the rolling resistance force are tire longitudinal forces acting in the tire contact patch 62. The tire longitudinal forces are characterized below by a tire longitudinal force variable that is to be determined by the method according to the present disclosure.

Figure 4:
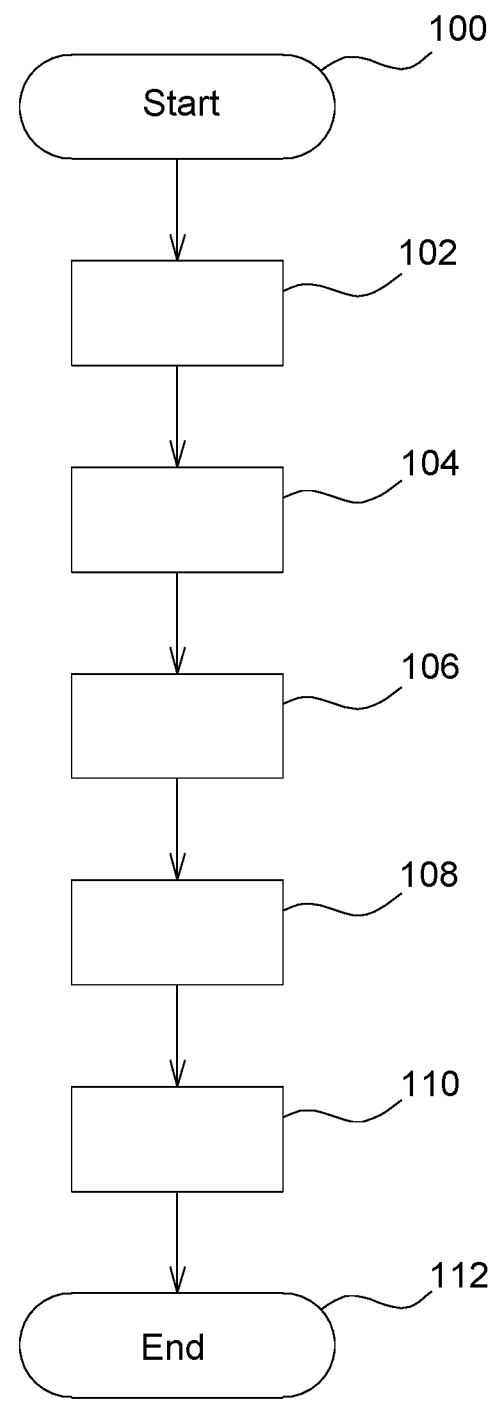
FIG. 4 shows an exemplary embodiment of the method according to the present disclosure in the form of a flow diagram.

FIG. 4 shows an exemplary embodiment of the method according to the present disclosure in the form of a flow diagram. The method proceeding in the processor unit 20 is started in an initialization step 100 when the agricultural tractor 12 is started up, or else manually via the operating control unit 30. Subsequently, in a first main step 102, the tire acceleration variable is determined by the acceleration sensor 40 via one or more full wheel revolutions or periods T and is evaluated by the processor unit 20 for determining the first time interval $t_1$ or angular distance $\varphi_1$ between the tire contact patch entry point 64 and the acceleration vertex 72 and the second time interval $t_2$ or angular distance $\varphi_2$ between the acceleration vertex 72 and the tire contact patch exit point 66. Tire contact patch entry point 64 and tire contact patch exit point 66 are provided here in an unambiguous manner by the two acceleration peaks 68, 70 (see in this respect FIG. 2 and FIG. 3).

In order to obtain mutually comparable values for the time intervals $t_1$, $t_2$, these are standardized by the processor unit 20 to a uniform tire circumferential speed on the basis of a wheel rotational speed detected by sensors. Such a standardization can be bypassed when the angular distances $\varphi_1$, $\varphi_2$ are used. The latter arise ultimately by temporal integration of the tire circumferential speed correlating to the wheel rotational speed detected by sensors.

In a second main step 104, a symmetry shift occurring between the two time intervals $t_1$, $t_2$ or angular distances $\varphi_1$, $\varphi_2$ is determined by the processor unit 20. This takes place by determination of a deviation occurring between the first and second time interval $t_1$, $t_2$ or angular distance $\varphi_1$, $\varphi_2$, $t_1 - t_2$ or $\varphi_1 - \varphi_2$.

On the basis of an assignment table specific to the type of tire used, the processor unit 20 subsequently determines the magnitude or direction of the tire longitudinal force variable, wherein, in the assignment table, a multiplicity of predetermined values for the symmetry shift are linked empirically with respectively corresponding values for the tire longitudinal force variable. In order to improve the data quality, the assignment table is modified by the processor unit 20 in accordance with information in respect of the filling pressure of the tire 56 or of the tire temperature. The relevant information are provided by the filling pressure sensor 42 or the temperature sensor 44 via the data exchange connection 52 of the processor unit 20. The tire longitudinal force variable determined in such a way generally contains components in respect of the rolling resistance and also components which are attributed to driving or braking forces of the agricultural tractor 12. In order in this respect to be able to make an unambiguous assignment, first of all for identifying the rolling resistance, a corresponding tire rolling resistance variable is determined. This takes place by the redetermination of the tire longitudinal force variable in a third main step 106, specifically each time whenever the processor unit 20 identifies on the basis of the operating status of an associated driving or braking system that the agricultural tractor 12 is in a travel state free from driving force or braking force. This provides a value for the tire rolling resistance variable that is always current in respect of the respective composition of the underlying surface.

In a fourth main step 108, the processor unit 20 provides the tire longitudinal force resistance which is adjusted with respect to the rolling resistance reproduced by the tire rolling resistance variable. A direct conclusion regarding the driving or braking forces acting on the tire 56 can be drawn on the basis of the tire longitudinal force variable.

By way of example, the rolling resistance variable and also the tire longitudinal force variable adjusted in this respect are used in a fifth main step 110 within the scope of a drive management system of the agricultural tractor 12. The drive management system can serve, inter alia, for optimizing the traction force of the agricultural tractor 12 during ploughing or the like. Subsequently, the method according to the present disclosure is ended in a subsequent final step 112.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for dynamically determining a tire longitudinal force, comprising:
   determining a tire acceleration variable by an acceleration sensor arranged in a tire bead, where the variable is defined as an acceleration occurring within the tire bead;
   determining a first time interval between a tire contact patch entry point and an acceleration vertex by a processor unit;
   determining a second time interval between the acceleration vertex and a tire contact patch exit point by the processor unit; and
   determining a magnitude or direction of a tire longitudinal force variable comprising a tire longitudinal force by the processor unit from a symmetry shift detected between the first and second time intervals.

2. The method as claimed in claim 1, further comprising determining the tire longitudinal force variable by the processor unit on the basis of an assignment table specific to the type of tire used.

3. The method as claimed in claim 2, further comprising modifying the assignment table by the processor unit in accordance with information in respect of a filling pressure of the tire or a tire temperature.

4. The method as claimed in claim 1, further comprising determining a rolling resistance variable by the processor unit on the basis of the tire longitudinal force variable determined in a travel state free from a driving force or a braking force.

5. The method as claimed in claim 1, wherein the tire acceleration variable is determined by the acceleration sensor by an acceleration acting tangentially or radially in the tire contact patch.

6. The method as claimed in claim 1, further comprising evaluating a variation in a tire circumferential speed due to a radius change caused during the rotationally induced passage through the tire contact patch by the processor unit.

7. The method as claimed in claim 6, further comprising using the variation in tire circumferential speed for determining the tire acceleration variable.

8. The method as claimed in claim 1, further comprising determining the tire acceleration variable wirelessly by the acceleration sensor.

9. A method for dynamically determining a tire longitudinal force of a tire on a work vehicle, comprising:

providing a data detection unit embedded in a tire bead of the tire, an acceleration sensor, a filling pressure sensor, and a temperature sensor;

determining a tire acceleration variable by the acceleration sensor over a time period defined as a single revolution of the tire;

determining, by a processor unit, a first time interval of the time period between a tire contact patch entry point and an acceleration vertex;

determining, by the processor unit, a second time interval of the time period between the acceleration vertex and a tire contact patch exit point by the processor unit;

detecting, by the processor unit, a symmetry shift occurring between the first and second time intervals; and determining, by the processor unit, a magnitude or direction of a tire longitudinal force variable based on the detected symmetry shift.

10. The method as claimed in claim 9, wherein the detecting step comprises determining a deviation between the first and second time intervals.

11. The method as claimed in claim 9, further comprising determining the symmetry shift from a plurality of predetermined values stored in an assignment table corresponding to the tire longitudinal force variable.

12. The method as claimed in claim 9, further comprising determining the tire longitudinal force variable by the processor unit on the basis of an assignment table specific to the type of tire used.

13. The method as claimed in claim 12, further comprising modifying the assignment table by the processor unit based on a filling pressure of the tire detected by the filling pressure sensor or a tire temperature detected by the temperature sensor.

14. The method as claimed in claim 9, further comprising determining a rolling resistance variable by the processor unit on the basis of the tire longitudinal force variable determined in a travel state free from a driving or a braking force.

15. The method as claimed in claim 9, wherein the tire acceleration variable is determined by the acceleration sensor by an acceleration acting tangentially or radially in the tire contact patch.

16. The method as claimed in claim 9, further comprising evaluating a variation in a tire circumferential speed due to a radius change caused during the rotationally induced passage through the tire contact patch by the processor unit.

17. The method as claimed in claim 16, further comprising using the variation in tire circumferential speed for determining the tire acceleration variable.

18. The method as claimed in claim 9, further comprising determining the tire acceleration variable wirelessly by the acceleration sensor.

19. The method as claimed in claim 9, further comprising:

determining a rolling resistance variable when the tire is freely rolling without being influenced by a driving force or braking force of the vehicle; and optimizing a traction force of the tire based on the rolling resistance variable and the tire longitudinal force variable.

20. A method for dynamically determining a tire longitudinal force, comprising:

determining a tire acceleration variable by an acceleration sensor arranged in a tire bead, where the variable is defined as an acceleration occurring within the tire bead;

determining a first angular distance between a tire contact patch entry point and an acceleration vertex by a processor unit;

determining a second angular distance between the acceleration vertex and a tire contact patch exit point by the processor unit; and determining a magnitude or direction of a tire longitudinal force variable comprising a tire longitudinal force by the processor unit from a symmetry shift detected between the first and second angular distances.

* * * * *